United States Patent

[11] 3,581,425

| [72] | Inventor | Donald J. Orr |
| | | 1617 Hill Ave., Arnolds Park, Iowa 51331 |
| [21] | Appl. No. | 824,374 |
| [22] | Filed | May 6, 1969 |
| [45] | Patented | June 1, 1971 |
| | | Continuation of application Ser. No. 547,109, Feb. 14, 1966, now abandoned. |

[54] FLEXIBLE SHAFTS
5 Claims, 5 Drawing Figs.

[52] U.S. Cl. ............................................. 43/18
[51] Int. Cl. ............................................ A01k 87/00
[50] Field of Search .................................. 43/18

[56] References Cited
UNITED STATES PATENTS

| 1,961,969 | 6/1934 | Heddon | 43/18 |
| 2,196,742 | 4/1940 | Cowdery et al. | 43/18 |
| 2,196,743 | 4/1940 | Cowdery et al. | 43/18 |
| 2,341,053 | 2/1944 | Mason | 43/18 |
| 3,003,275 | 10/1961 | Reid | 43/18 |
| 3,260,010 | 7/1966 | Dubois | 43/18 |

*Primary Examiner*—Warner H. Camp
*Attorney*—Orrin M. Haugen

ABSTRACT: A hollow core flexible shaft having a tip end and a butt end, the structure being adapted to receive an applied load at the tip end thereof, the cross-sectional area of the solid portion increasing from the tip end to the butt end in order to provide equal stresses along the length of the shaft. The shaft is provided with a hollow core having a configuration which lies substantially midway between a parabolic curve and a hyperbolic curve with a common vertex substantially at the tip end of the rod, and a common point at the butt end of the rod.

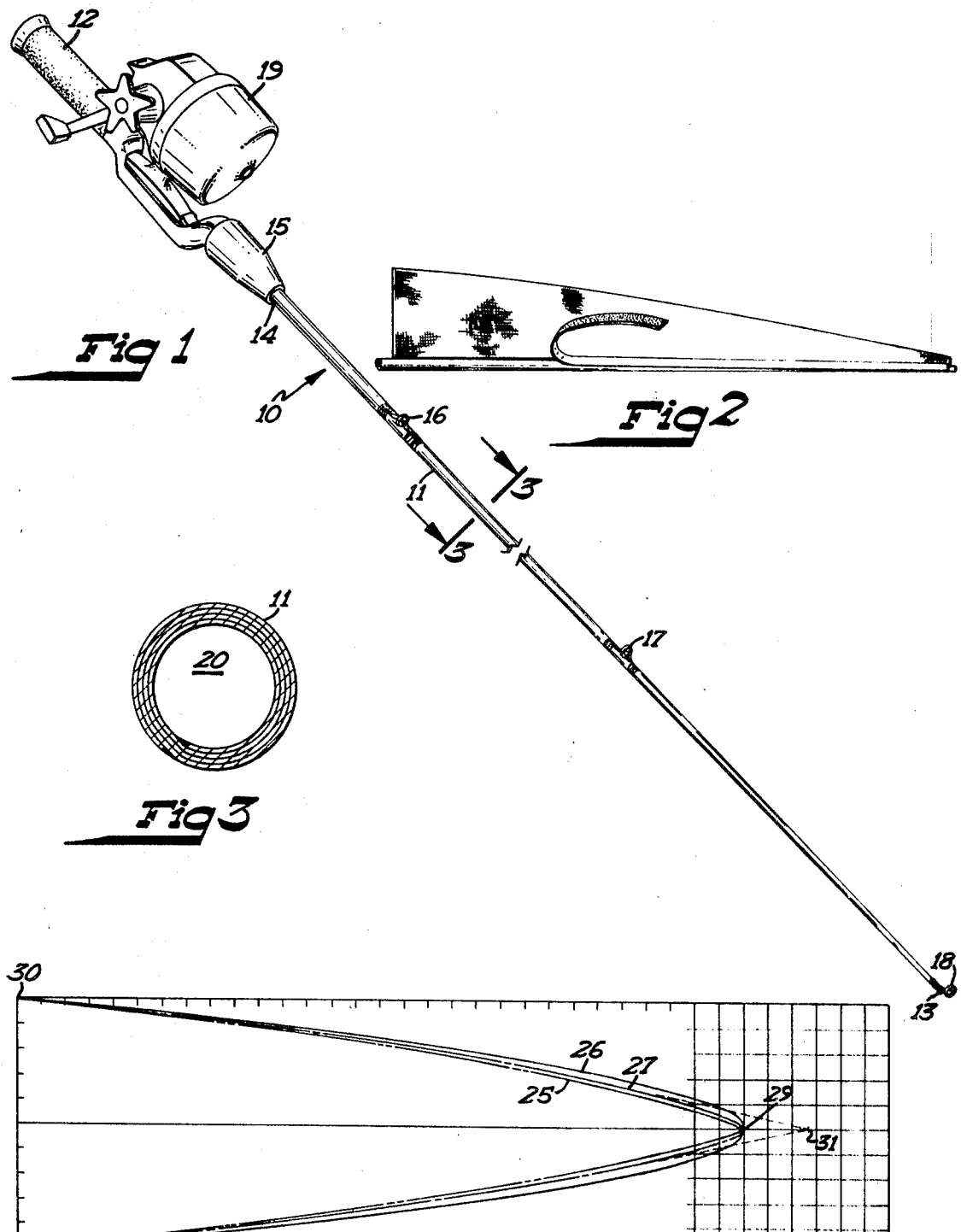

FLEXIBLE SHAFTS

The present invention relates generally to an improved fishing rod, and more specifically to an improved fishing rod utilizing a shaft with a hollow core prepared from glass fibers impregnated with a curable resin and having a cross-sectional solid area which increases at a predetermined rate from the tip end to the butt end thereof. The rate of change of cross-sectional solid area is such that the bending stresses applied to the tip of the rod will be uniformly distributed throughout at least a substantial portion of the length of the rod.

In the design of fishing rod devices, it is generally desirable to have a rod which will experience a minimum of localized structural fatigue, and which will also respond in a desirable manner to the user. Among the factors to be considered in utilization of a casting rod are the "power factor" and the output response which the rod provides to a given input of energy. In order to obtain a desired "power factor," that is, the most energy output for a given applied force, it is desirable that the rod will experience a minimum of spurious vibrations along the axis thereof which tend to operate in a cancellation fashion, and thereby dissipate the energy out for the rod system, or in a reinforcing fashion to cause unpredictable action. A truer cast will always be available for a rod which operates in a predictable manner and which is substantially free of spurious vibrations. Also, it has been learned when a given rod is subjected to the playing of a fish, a rod which functions in a predictable manner will enable the user to maintain a constant tension on the line, without permitting slack to develop which will in turn permit the fish to disengage. Each of these desirable characteristics may be found in a fishing rod which exhibits uniform stresses along the axial length thereof, or a substantial portion of the length thereof, in response to a given applied stress.

The provision of a rod having a uniform stress characteristic for a given applied load may be readily determined, this being provided by utilizing a cross-sectional area which area increases at a rate which follows a substantially parabolic curve from the tip end to the butt end thereof. For a shaft having a hollow core, the solid area of the shaft should likewise follow such a parabolic curve from the tip end to the butt end thereof in order to exhibit a uniform distribution of stress for a given applied load. The derivation of this theory is available from the distribution of loads along cantilevered beams. It has been generally recognized that the most desirable action in a fishing rod is available in a fishing rod having a hollow core shaft. Thus, for a given weight of rod, the most desirable beam action is available in a shaft having a hollow core structure. It is possible to determine the solid area needed for a given applied load, provided only the beam strength is considered. However, in addition, the most desirable beam action has been found to be available in a glass fiber material impregnated with a curable resin, and the glass fibers utilized for this desirable action normally having all or substantially all of the fibers running in the axial direction of the finished rod. Thus, while the beam strength is adequately provided for, the barrel strength has been found to be inadequate, particularly as the diameter of the hollow core shaft is increased. It will be appreciated, therefore, that as the diameter of the hollow core increases, a better beam action is obtained, however this is invariably obtained with a sacrifice in barrel strength for a given material. On the other hand as the area of the hollow core decreases, the action of the beam becomes less desirable for fishing purposes, and therefore the barrel strength increases with a sacrifice in desirable fishing rod characteristics. In accordance with the present invention, it has been determined that the hollow core of the rod will increase in its cross-sectional area between the tip end and the butt end of the rod, the rate of increase being defined by a certain predetermined curve which lies along a substantially parabolic curve selected between first and second curves, these curves being a parabolic and a hyperbolic curve, each having its vertex or an origin at or adjacent the tip portion of the rod, and converging and each passing through a common point at the butt end thereof. Preferably, a point substantially midway between the curves will be satisfactory for most purposes, although for a greater amount of barrel strength, a point closer to the inner curve or the hyperbolic curve will be generally more desirable. It will be appreciated, that the curve utilized for the inner core dimension will preferably follow a regular pattern from the tip end to the butt end thereof, that is, will bear a definite relationship between the two curves between which it is disposed.

In practice, the core is readily defined by the shape of a mandrel upon which a pattern of glass fibers impregnated with a curable resin are wound. The cross-sectional solid area of this glass fiber impregnated material will accordingly increase at a predetermined rate from the tip end to the butt end, the arrangement being such that applied bending stresses will be uniformly distributed throughout at least a substantial portion of the length of the rod.

If a constant wall thickness is utilized for a fishing rod shaft, the increase in area being obtained with a straight increase in diameters, it has been found that the mounting point for the hardware must be moved to a point which is too far removed from the tip to be practical. In other words, the tip portion of the rod will be too strong for the ordinary rod strength, with the barrel strength being at a maximum adjacent the tip, and at a minimum adjacent the butt. Furthermore, about one-fourth the length of such a rod will be needed to provide a point where hardware may be attached to a straight taper piece, it being appreciated that a minimum diameter should be reached at the apex, and not at a different point.

If the curve for the hyperbola is followed for the increase in cross-sectional area from the tip end to the butt end thereof, it has been found that the curve is too flat adjacent the end areas, thereby upsetting the normal vibration pattern for the overall rod system.

If a uniform straight taper is utilized, it has been found that the center portion of the rod will be unusually weak. This is particularly true if a constant thickness of wall is employed.

In order to provide a suitable tip for hardware mounting, it has been found that a portion equal to something less than 10 percent of the length of the rod and located at the tip end thereof may be of uniform thickness and uniform strength, the cross-sectional area of the rod increasing beyond this point and toward the butt end thereof.

It is therefore an object of the present invention to provide an improved fishing rod which employs a shaft having a uniform stress distribution for applied loads, and which is formed with a hollow core, the cross-sectional solid area of the shaft providing an optimum balance between the beam strength and the barrel strength thereof.

It is a further object of the present invention to provide an improved fishing rod structure which employs a shaft having a hollow core, the shaft being arranged to be uniformly stressed for given loads applied thereto, and which also has good tip strength and action.

Other and further objects of the present invention will become apparent to those skilled in the art upon a study of the following specification, appended claims, and accompanying drawings wherein:

FIG. 1 is a perspective view of a fishing rod prepared in accordance with the teachings of the present invention;

FIG. 2 is a plan view of a mandrel to which a predetermined pattern of a glass fiber impregnated with a curable resin is applied in bonded rolled relationship thereto;

FIG. 3 is a cross-sectional view taken along the axis of the rod shown in FIG. 1;

FIG. 4 is a schematic diagram of the curves utilized to prepare the mandrel upon which the glass fiber impregnated material is wound.

Figure 5:
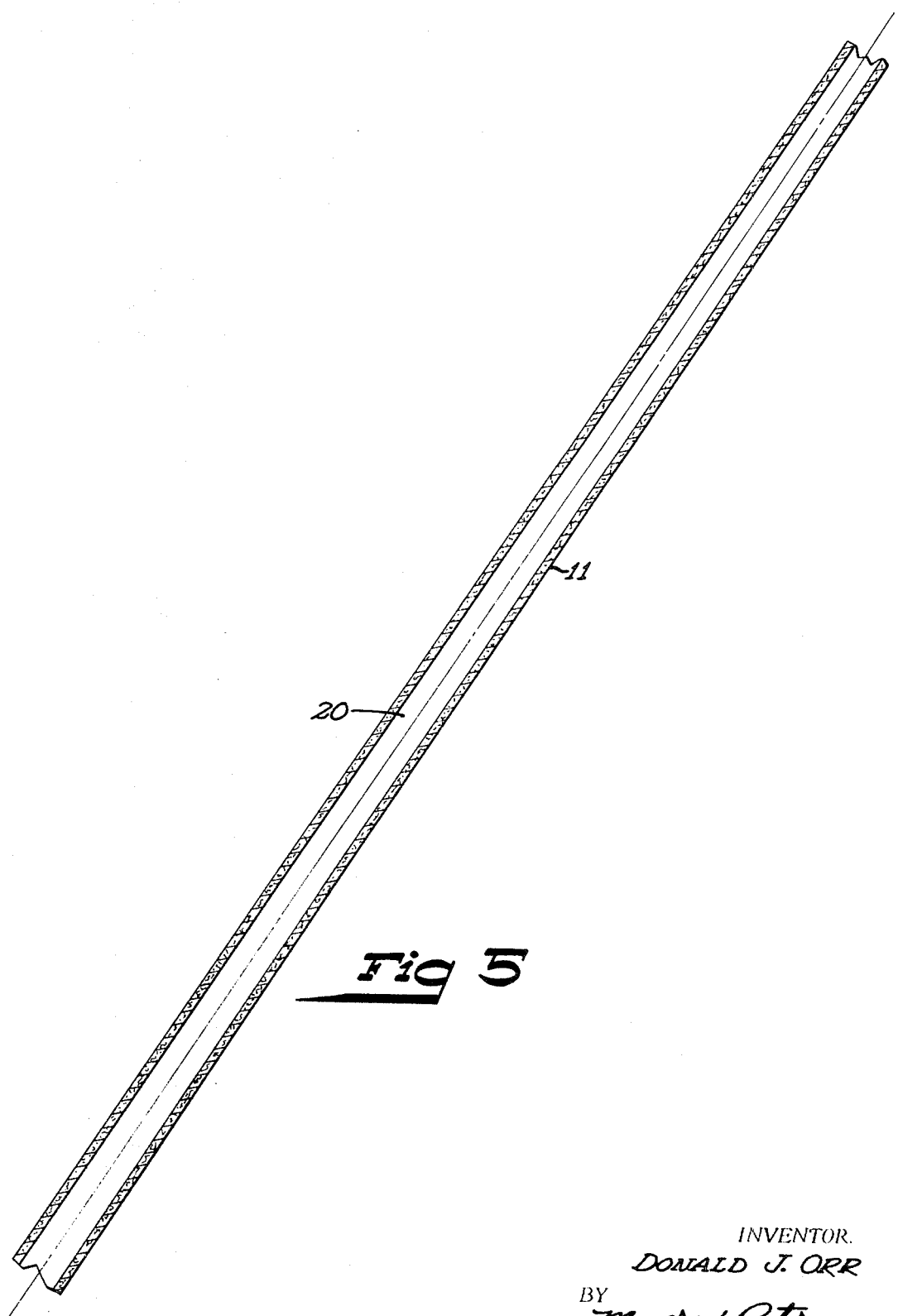
FIG. 5 is a longitudinal sectional view of a longitudinal segment of a rod prepared in accordance with the present invention.

In accordance with the preferred modification of the present invention and particularly as shown in the drawings, the fishing rod shown in FIG. 1 generally designated 10 includes a shaft portion 11 together with a handle portion 12.

The tip of the rod is shown at 13, and the butt end is shown at 14, the butt end being received within the handle or ferrule member 15. The rod includes suitable mounting hardware shown at 16 and 17 along the shaft thereof, the tip mounting hardware being shown at 18. The mounting hardware members 16, 17 and 18 are provided with suitable guide ferrules for retaining the fishing line which is wound upon the winding spool provided in the reel 19.

The cross-sectional configuration of the shaft 11 is shown in FIG. 3, the hollow core 20 being illustrated therein. As indicated previously this hollow core provides a desirable compromise between the action desired along the beam, and the barrel strength which is compatible with the expected use of the rod.

Attention is now directed to FIG. 2 and 4 of the drawings, wherein the mandrel design for forming the core 20 within the shaft 11 is shown along with the design of the glass fiber impregnated material being utilized for a rolling cover on the surface of the mandrel. With specific attention being directed to FIG. 4, it will be seen that the curves plotted thereon include an inner hyperbolic curve 25, and outer generally parabolic curve 26, and an intermediate curve 27 which is disposed between the curve 25 and 26. The curves 25 and 26 as well as 27 have a common vertex as at 29, and a common intersecting point at 30. The nature of the curves 25 and 26 will now be discussed herein below.

Curve 25 represents a hyperbolic or substantially hyperbolic curve having a vertex point at 29 and an intersection point at 30 with the substantially parabolic curve 26. The substantially parabolic curve 26 shares a common vertex point 29 as well as an intersection point 30. The curve 27 which lies substantially midway between the curves 25 and 26 and is preferably determined by extracting the square root of the sum of one-third of the square of the "radius" of the parabolic surface plus two-thirds of the square of the "radius" of the hyperbolic surface at the same given point. In this manner, a substantially constant curve may be generated which will provide a proper mandrel design for forming the core of the hollow shaft. It is this curve which provides a substantial match between the curve for the hyperbola which has been found to be too flat adjacent the end areas, and the curve of the parabola which has been found to be too heavy adjacent the end areas. It will be appreciated that other proportions lying between the two curves may be utilized, such as, for example, a curve which lies substantially midway between the two curves; however, the example previously given has been found to be preferable for most materials.

Attention is directed to the point 31 which is disposed forwardly of the curves. The straight lines which are projected toward the points such as represented by 30 from the point 31 are noted to lie substantially along the line 27 particularly after a distance of about 10 percent of the distance from the vertex to the intersection point 30 have been reached. This arrangement or disposition is believed responsible for the enhanced barrel strength characteristics of the rods fabricated in accordance with this technique. Generally speaking, the mandrel will reach substantially 50 percent of its diameter at about one-third of its axial length from the vertex, and will reach substantially 80 percent of its maximum radius, at about two-thirds or 70 percent of its axial length.

The pattern which is superimposed on the surface of the mandrel, that is, the pattern of the fiberglass which is superimposed thereon is arranged to have all, or a substantial portion of its length uniformly stressed. In one particular embodiment, the following example was found to provide the desired characteristics.

Example I

A phenolic impregnated glass fabric was utilized wherein the rovings comprise between 80 percent of the fabric, balance binder was utilized. This material had a thickness of 0.010 inches, and the rovings were arranged generally in one direction and substantially axially of the rod. It will be appreciated that other plastic substances may be utilized, such as for example, fabrics with from 70 percent to 90 percent glass, balance binder, and binders such as epoxies and the like as well. This arrangement of glass fiber was found to give the desired beam strength for the units. In order to accomplish the desired result in the rod, the following wall thicknesses, based upon a percentage of the maximum thickness at the butt end, as a function of axial length percentage are provided:

TABLE 1

| Percent of axial length | Mandrel configuration based on figure 4 with ordinate equal to 5 | Percent of maximum wall thickness | Number of turns of 0.010" glass cloth |
| --- | --- | --- | --- |
| 0 | .4703 | 41.72 | 3 |
| 5 | .8183 | 41.72 | 3 |
| 10 | 1.1663 | 58.12 | 3 |
| 15 | 1.4893 | 65.46 | 3.37 |
| 20 | 1.7768 | 70.82 | 3.65 |
| 25 | 2.0412 | 74.99 | 3.86 |
| 30 | 2.2887 | 78.41 | 4.04 |
| 35 | 2.5232 | 81.30 | 4.19 |
| 40 | 2.7475 | 83.77 | 4.32 |
| 45 | 2.9631 | 85.93 | 4.43 |
| 50 | 3.1714 | 87.86 | 4.53 |
| 55 | 3.3735 | 89.59 | 4.62 |
| 60 | 3.5700 | 91.16 | 4.70 |
| 65 | 3.7615 | 92.58 | 4.77 |
| 70 | 3.9487 | 93.89 | 4.84 |
| 75 | 4.1321 | 95.10 | 4.90 |
| 80 | 4.3118 | 96.21 | 4.96 |
| 85 | 4.4880 | 97.26 | 5.01 |
| 90 | 4.6613 | 98.23 | 5.06 |
| 95 | 4.8319 | 99.14 | 5.11 |
| 100 | 5.0000 | 100 | 5.16 |

The glass fiber used has a flexural strength of between 130,000 p.s.i. to 135,000 p.s.i. The modulus of elasticity of this material is between 4,600,000 p.s.i. to 5,200,000 p.s.i. The lower limits of each of these values may be used for design safety.

The percentage of thickness may be utilized as a measure of the ultimate pattern of the glass cloth to be wound on the mandrel. Thus, with the proper design parameters, and using this table, it is possible to provide a family of fishing rods which will display the desirable characteristics of the present invention. For a 7-foot rod designed for a load of about 15 pounds, the mandrel diameter would be about 0.4 inches at the butt end and the wrapping thereon as indicated.

Rods of this type will be satisfactory if a substantial portion, that is two-thirds of the length from the tip back toward the butt of the shaft has uniform stress characteristics, the remainder being proportionally heavier. These rods will have fast tip action since the flex point is moved toward the tip with the substantial portion of the rod having uniform stress, the tip 10 percent of the rod being generally tangent to the converging configuration of the outer rod surface.

In order to assist those skilled in the art, the following example will be given for the design of an actual rod. Assuming that a rod having a length of about 72 inches, and further assuming that the diameter of the core will not be less than about 0.04 inches at the tip due to limitations of machining and mandrel rolling, and assuming further that the butt end of the rod will have a diameter of no greater than about one-half inch in order to conform to the inner diameter of a handle, the following criteria will be useful.

Example II

The mandrel design based on Example I may be utilized having a maximum diameter of 0.443 inches at 84 inches. The basic premise of the design of the equally stressed fishing rod is that the bending stress should remain constant throughout the length of the rod. In order to achieve this, a property of the cross section known as the section modulus must vary with the bending moment along the length of the rod. It has also been assumed that the bending stresses vary directly from the neutral axis. The section modulus for a hoop is given below (which represents the fishing rod cross section):

$$S = \pi/32 \, (1-K^4) \, (O.D.)^3 \quad \text{Eqn. (1)}$$

This section modulus applies to any point along the length of the rod.

The bending stress ($f_b$) can be determined by dividing the moment ($M$) which is equal to the load ($P$) times the distance from the load to the point where the bending stress is to be determined ($X$) by the section modulus ($S$). This bending stress is given by the following formula:

$$f_b = \frac{M}{S} = \frac{P \cdot X}{S} \quad \text{Eqn. (2)}$$

Solving the equation above for the outside diameter of the fishing rod results in the equation given below:

$$O.D. = \left[\frac{32 P \cdot X}{\pi f_b (1-K^{-4})}\right]^{1/3}$$

The value of $K$ listed in the equations above is the ratio of the inside diameter of the fishing rod which corresponds to the outside diameter of the mandrel divided by the outside diameter of the fishing rod ($O.D.$). By using this relationship along with equation 3 one may arrive at the equation below.

$$\frac{(I.D.)^3 \pi f_b}{32 P \cdot X} = \frac{K^3}{(1-K^4)} \quad \text{Eqn. (4)}$$

The equation can most readily be solved by trial and error for $K$.

By the following the restrictions placed on the size of the rod, it was found that a load of 15 pounds applied at the tip of the rod would satisfy all of the restrictions. The final form of the equation used to solve for the $O.D.$ of the fishing rod is given below:

$$\frac{655 (I.D.)^3}{X} = \frac{K^3}{1-K^4} \quad \text{Eqn. (5)}$$

This assumes a load ($P$) equal to 15 pounds and an allowable bending stress ($f_b$) equal to 100,000 p.s.i.

It should be noted at this time that a heavier type of rod could also be designed by using equation 4. Of course, different criteria in regard to the maximum outside diameter of the fishing rod must first be determined.

The thickness ($tw$) of the fishing rod wall is given by the equation listed below:

$$tw = \frac{O.D. - I.D.}{2} \quad \text{Eqn. (6)}$$

The cross-sectional area of the fishing rod wall is given by the equation listed below:

$$Aw = \frac{\pi}{4} [(O.D.)^2 - (I.D.)^2] \quad \text{Eqn. (7)}$$

A sample calculation using equation 5 follows:

(a) $X = 53.2''$ (col. 1, Table No. 2)

The $I.D. = $ (col. 2, Table No. 2)

Substitution into Eqn. (5)

$$\frac{655(.328)^3}{53.2} = \frac{K^3}{1-K^4}$$

or $$.43261 = \frac{K^3}{1-K^4}$$

Assume $K = .693$ $$\frac{(.693)^3}{1-(.6693)^4} = .4326$$

(Note: this is a trial and error procedure to solve for $K$.)

Therefore $K = 0.693$ (col. 3, Table 2)

$$O.D. = \frac{.328}{.693} = 0.473'' \text{ (col. 4, Table No. 2)}.$$

$$\text{From } O.D. = \frac{I.D.}{k}$$

$$tw = \left[\frac{.473 - .328}{2}\right] = .073'' \text{ (col. 5, Table No. 2)}.$$

From Eqn. (6)

$$Aw = \frac{\pi}{4}[(.473)^2 - (.328)^2] = .0914 \text{ sq. in.}$$

(col. 6, Table No. 2). From Eqn. (7)

Length of wrap $= \dfrac{0.0914 \text{ sq. in.}}{.01 \text{ in.}}$ $= 9.14$ in. (col. 7, Table No. 2)

Table No. 2, was determined in like manner. This table represents a fishing rod that is equally stressed between $X=1.0$ inch to $X=84.0$ inch in bending. It should be noted that under the column headed Length of Wrap (Col. 7) different values have been determined for each point $X$. This assumes that the length of wrap corresponds to the total circumference of the material making up the fishing rod. The length of wrap can then be determined. For each point $X$, the cross-sectional area divided by the thickness of the glass material making up the wall of the rod. In the case, it has been assumed to be 0.010 inches. Using this assumption, a pattern then can be laid out knowing the length of wrap. It has been assumed that the material making up the wall of the rod will conform to the shape of the mandrel without notching the pattern. This condition is made possible by the use of the equipment wrapping the rod and by the material being able to stretch.

TABLE NO. 2.—DESIGN DATA FOR UNIFORMLY-STRESSED FISHING ROD

[$P=15$ lb.; $f_b=100{,}000$ p.s.i.]

| Rod length or X distance (inches) | I.D. of rod converted (inches) | K | O.D. of rod (inches) | Thickness of rod wall $tw$ (inches) | Cross sectional area of rod wall $Aw$ (sq. inches) | Length of wrap (inches) |
|---|---|---|---|---|---|---|
| (Col. 1) | (Col. 2) | (Col. 3) | (Col. 4) | (Col. 5) | (Col. 6) | (Col. 7) |
| 0.0 | .0417 | | (.10) | (.029) | (.0065) | (.65) |
| 1.0 | .0490 | .421 | .116 | .034 | .0088 | .88 |
| 4.2 | .0725 | .387 | .187 | .057 | .0234 | 2.34 |
| 8.4 | .104 | .440 | .237 | .066 | .0356 | 3.56 |
| 12.6 | .132 | .483 | .273 | .071 | .0448 | 4.48 |
| 16.8 | .158 | .521 | .302 | .072 | .0521 | 5.21 |
| 21.0 | .181 | .552 | .328 | .074 | .0588 | 4.88 |
| 25.2 | .207 | .588 | .352 | .073 | .0636 | 6.36 |
| 29.4 | .224 | .600 | .372 | .074 | .0696 | 6.96 |
| 33.6 | .244 | .621 | .392 | .074 | .0738 | 7.38 |
| 37.8 | .263 | .639 | .411 | .074 | .0786 | 7.86 |
| 42.0 | .281 | .656 | .428 | .074 | .0819 | 8.19 |
| 46.2 | .299 | .671 | .455 | .073 | .0855 | 8.55 |
| 50.4 | .316 | .684 | .463 | .073 | .0900 | 9.00 |
| 53.2 | .328 | .693 | .473 | .073 | .0914 | 9.14 |
| 54.6 | .334 | .698 | .478 | .072 | .0922 | 9.22 |
| 58.8 | .350 | .709 | .494 | .072 | .0954 | 9.54 |
| 63.0 | .368 | .722 | .510 | .071 | .0978 | 9.78 |
| 67.2 | .382 | .730 | .523 | .071 | .1001 | 10.01 |
| 71.4 | .398 | .739 | .538 | .070 | .1031 | 10.31 |
| 74.2 | .408 | .746 | .546 | .069 | .1039 | 10.39 |
| 78.4 | .422 | .753 | .560 | .069 | .1063 | 10.63 |
| 82.6 | .438 | .762 | .575 | .068 | .1083 | 10.81 |
| 84.0 | .443 | .765 | .579 | .068 | .1082 | 10.84 |

A longitudinal cross-sectional view of a rod prepared according to this table is shown in FIG. 5. It will, of course, be understood that various changes may be made in the form, details, arrangements and proportions of the parts without departing from the scope of my invention.

I claim:

1. A fishing rod tapered from the butt end to the tip end thereof, and comprising a gripping handle and a hollow core shaft secured thereto:
   a. the hollow core shaft being prepared from glass fibers impregnated with a curable resin and having a cross-sectional solid wall thickness which is substantially greater at the butt end than at the tip end and a cross-sectional solid wall area which increases at a predetermined rate from the tip end to the butt end with the applied bending stresses being uniformly distributed throughout a substantial portion of the length of the rod;

b. the cross-sectional area of the hollow core of the shaft between the tip end and the butt end increasing toward the butt end at a rate which is defined by a certain predetermined curve which lies generally along a substantially parabolic curve selected between first and second curves, the first of these two curves being a parabolic curve and the second being a hyperbolic curve, each of said first and second curves having a common vertex at the tip thereof and each diverging and passing through a common point at the butt end thereof, and said substantially parabolic curve of said cross-sectional hollow area lying substantially midway between said first and second curves.

2. The fishing rod as defined in claim 1 being particularly characterized in that said substantially parabolic curve of said cross-sectional hollow area lies along a curve having at given points therealong a radius equal to the square root of the sum of one-third of the square of the parabolic radius and two-thirds of the square of the hyperbola-type curve radius.

3. The fishing rod as defined in claim 1 being particularly characterized in that the axes of the glass fibers lie substantially along and generally parallel to the axis of the rod.

4. A fishing rod tapered from the butt end to the tip end thereof, and comprising a gripping handle and a hollow core shaft secured thereto;

a. the hollow core shaft being prepared from glass fibers impregnated with a curable resin and having a cross-sectional wall thickness with a solid area which increases at a certain first predetermined rate along a first axial length portion extending from the tip end to a certain transitional point disposed toward the butt end and at a certain second predetermined rate from said transitional point to the butt end thereof with the wall thickness of the said first axial length portion being substantially constant, and with the wall thickness of the said second axial length portion increasing at a predetermined rate such that the applied bending stresses are substantially uniformly distributed throughout said second axial length portion;

b. the cross-sectional area of the hollow core of the shaft between the transitional point and the butt end increasing toward the butt end at a rate which is defined by a certain predetermined curve which lies along a substantially parabolic curve selected between first and second curves, the first of the said two curves being parabolic and the second curve being hyperbolic, each of said two curves having a common vertex at the tip thereof, and each diverging and passing through a common point at the butt end thereof, said substantially parabolic curve of said hollow core lying substantially midway between said first and second curves;

c. the cross-sectional area of the hollow core of the shaft between the tip end and the said transitional point increasing from the tip end to the butt end along a straight line which is substantially tangent to said substantially parabolic curve at said transitional point;

d. said first axial length portion comprising less than about 10 percent of said rod length, said second axial length portion comprising the balance thereof.

5. The fishing rod as defined in claim 4 being particularly characterized in that said first axial length portion comprises more than about 9 percent and less than about 10 percent of the rod length.